United States Patent
Sapper

Patent Number: 6,129,989
Date of Patent: Oct. 10, 2000

[54] PROCESS FOR THE PRODUCTION OF MULTILAYERED COATINGS

[75] Inventor: Götz-Ekkehard Sapper, Ostbevern-Brock, Germany

[73] Assignee: BASF Coatings AG, Muenster-Hiltrup, Germany

[21] Appl. No.: 09/091,633

[22] PCT Filed: Dec. 18, 1996

[86] PCT No.: PCT/EP96/05692

§ 371 Date: Jul. 21, 1998

§ 102(e) Date: Jul. 21, 1998

[87] PCT Pub. No.: WO97/23306

PCT Pub. Date: Jul. 3, 1997

[30] Foreign Application Priority Data

Dec. 21, 1995 [DE] Germany .......................... 195 47 944

[51] Int. Cl.[7] .................. B32B 27/00; B05D 1/36
[52] U.S. Cl. ................. 428/500; 427/140; 427/142; 427/407.1; 427/410; 428/414; 428/483
[58] Field of Search ................. 427/407.1, 409, 427/140, 299, 322, 410, 142; 428/424.2, 414, 483, 500, 515, 522, 523

[56] References Cited

U.S. PATENT DOCUMENTS

| | | | |
|---|---|---|---|
| 3,035,004 | 5/1962 | Glavis . | |
| 4,764,554 | 8/1988 | Tonge | 524/558 |
| 5,157,069 | 10/1992 | Campbell | 524/500 |
| 5,380,447 | 1/1995 | Kirk et al. | 252/8.6 |
| 5,385,960 | 1/1995 | Emmons et al. | 523/205 |
| 5,478,602 | 12/1995 | Shay et al. | 427/389 |
| 5,633,037 | 5/1997 | Mayer | 427/140 |
| 5,698,330 | 12/1997 | Bederke et al. | 427/407.1 |
| 5,786,033 | 7/1998 | Gast et al. | 427/412.1 |
| 5,798,421 | 8/1998 | Corpart et al. | 525/326.9 |

Primary Examiner—Diana Dudash

[57] ABSTRACT

A process is claimed for producing a multilayer coating on a substrate surface, in which (A) an aqueous coating composition comprising as film-forming agent an aqueous polymer dispersion is applied as basecoat composition to a substrate surface coated with a customary primer surfacer, (B) a suitable transparent topcoat composition is applied to the basecoat thus obtained, and (C) the basecoat is baked together with the topcoat, wherein the basecoat composition comprises an aqueous polymer dispersion comprising (i) an acrylate polymer based on from 30 to 60% by weight of $C_1$–$C_8$-alkyl (meth)acrylate monomers, from 30 to 60% by weight of vinyl-aromatic monomers and from 0.5 to 10% by weight of (meth)acrylic acid, and (ii) a thickener, which does not have an associative action, comprising an acrylate copolymer based on ($C_1$–$C_6$)-alkyl (meth)acrylate and (meth)acrylic acid.

17 Claims, No Drawings

PROCESS FOR THE PRODUCTION OF MULTILAYERED COATINGS

The present invention relates to a process for producing multilayer coatings on a substrate surface, in which
(A) an aqueous coating composition comprising as film-forming agent an aqueous polymer dispersion is applied as basecoat to a substrate surface coated with a customary primer surfacer,
(B) a suitable transparent topcoat composition is applied to the basecoat thus obtained, and
(C) the basecoat is baked together with the topcoat, and to coated substrates which can be produced by this process.

The prior art discloses processes for coating motor-vehicle bodies, especially car bodies, in which the substrate is generally coated first with an electro-deposition coating material and/or anti-stonechip intermediate primer or a primer surfacer coat, and then a basecoat is applied, using a coating material containing at least one pigment, and this basecoat layer is over-coated, if desired, with a transparent coating material. The resulting single-layer or multilayer coating system is then baked.

The basecoats used to produce the basecoat layer are customarily systems based on water and/or solvent. As principal binder they generally include polyurethane dispersions or acrylate dispersions combined with water-miscible crosslinkable polyesters and water-miscible melamine resins, which give rise to a range of problems such as, for example, low storage stability, a tendency toward yellowing, and unstable viscosity. A further factor is that the polyurethane dispersions lead to difficulties in connection with the production of metallic coatings, for example using aluminum bronzes. Repair carried out to these coatings leads to visuallly unacceptable results.

The object of the present invention is to provide a process for producing multilayer coatings and a process for repairing multilayer coatings on a substrate surface, wherein an aqueous basecoat composition is employed which does not have the abovementioned disadvantages and which is suitable as a basecoat both for solid-color coatings and metallic and/or mica effect finishes. Furthermore, this coating composition should be compatible with customary transparent coating materials, for example aqueous or solvent-containing clearcoats or transparent powder coatings, and these transparent coating materials should be able to be applied to the basecoat without any deterioration in the appearance of the coating system.

The present invention accordingly provides a process for producing a multilayer coating on a substrate surface, in which
(A) an aqueous coating composition comprising as film-forming agent an aqueous polymer dispersion is applied as basecoat composition to a substrate surface coated with a customary primer surfacer,
(B) a suitable transparent topcoat composition is applied to the basecoat thus obtained, and
(C) the basecoat is baked together with the topcoat,
wherein the basecoat composition comprises an aqueous polymer dispersion comprising
(i) an acrylate polymer based on from 30 to 60% by weight of $C_1$–$C_8$-alkyl (meth)acrylate monomers, from 30 to 60% by weight of vinyl-aromatic monomers and from 0.5 to 10% by weight of (meth)acrylic acid, and
(ii) a thickener, which does not have an associative action, comprising an acrylate copolymer based on ($C_1$–$C_6$)-alkyl (meth)acrylate and (meth) acrylic acid.

The present invention also provides a process for repairing multilayer coatings, in which
(D) a basecoat applied to a customary primer surfacer is repaired with an aqueous coating composition containing aqueous polymer dispersion as film-forming agent,
(E) the coating obtained in step (D) is coated with a suitable transparent topcoat composition, and
(F) the basecoat is baked together with the topcoat,
wherein the basecoat composition comprises an aqueous polymer dispersion comprising
(i) an acrylate polymer based on from 30 to 60% by weight of $C_1$–$C_8$-alkyl (meth)acrylate monomers, from 30 to 60% by weight of vinyl-aromatic monomers and from 0.5 to 10% by weight of (meth)acrylic acid, and
(ii) a thickener, which does not have an associative action, comprising an acrylate copolymer based on ($C_1$–$C_6$)-alkyl (meth)acrylate and (meth) acrylic acid.

Surprisingly it has been found that the novel process for producing multilayer coatings is highly suited to the production of multilayer coatings on substrates and for repairing multilayer coatings, especially for car bodies. Any desired transparent coating materials can be applied to the basecoat, examples being aqueous or solvent-containing coating materials or else powder coatings, which is not possible in the processes known from the prior art. Coatings comprising the basecoat used in accordance with the invention can be repaired without problems in cases of damage.

As $C_1$–$C_8$-alkyl(meth)acrylate monomer units, the acrylate polymer of component (i) employed in accordance with the invention can comprise the linear and branched-chain derivatives, with methyl (meth)acrylate, ethyl (meth)acrylate, n-propyl and isopropyl (meth)acrylate, n-butyl and isobutyl (meth)acrylate and 2-ethylhexyl (meth)acrylate being preferred. (Meth)acrylamide monomers and derivatives thereof can also be present as additional monomers.

Examples which may be mentioned of vinyl-aromatic monomers in the form of monomer units in the acrylate polymer of component (i) are styrene, α-alkylstyrene and vinyltoluene.

The acrylate polymer can be prepared by methods known from the prior art, for example emulsion polymerization. The acrylate polymer is preferably employed in the form of a dispersion. During the preparation process, the proportion between the monomers and the water is preferably established such that the resulting dispersion has a solids content of from 30 to 60% by weight, preferably from 35 to 60% by weight, and can be employed directly for preparing the basecoat composition. A particularly suitable acrylate polymer is obtainable commercially as an aqueous dispersion under the designation Acronal 290 D (BASF AG; Ludwigshafen).

To prepare a dispersion of the acrylate polymer it is preferred as emulsifier to employ an anionic emulsifier alone or in a mixture with others.

Examples of anionic emulsifiers are the alkali metal salts of sulfuric acid half-esters of alkylphenols or alcohols, and the sulfuric acid half-esters of ethoxylated alkylphenols or ethoxylated alcohols, preferably the alkali metal salts of the sulfuric acid half-ester of a nonylphenol reacted with from 4 to 5 mol of ethylene oxide per mole, of alkyl- or arylsulfonate, sodium lauryl sulfate, sodium lauryl ethoxylate sulfate and secondary sodium alkanesulfonates whose carbon chain includes 8–20 carbon atoms. The amount of anionic emulsifier is from 0.1 to 5.0% by weight, based on the monomers, preferably from 0.5 to 3.0 by weight.

Furthermore, in order to increase the stability of the aqueous dispersions, it is additionally possible to employ a nonionic emulsifier of the type of an ethoxylated alkylphenol or fatty alcohol, for example an addition product of 1 mol of nonylphenol and from 4 to 30 mol of ethylene oxide in a mixture with the anionic emulsifier.

The glass transition temperature of the acrylate polymer is preferably between 15° C. and 35° C., particularly preferably between 20° C. and 25° C.

The acrylate polymer employed in accordance with the invention preferably has a number-average molar mass (determined by gel permeation chromatography using polystyrene as standard) of from 200,000 to 2,000,000, preferably from 300,000 to 1,500,000.

As thickener component (ii) in the basecoat composition use is made in accordance with the invention of acrylate copolymers having nonassociative groups, comprising $(C_1-C_6)$-alkyl (meth)acrylate and (meth)acrylic acid as monomer units. A preferred copolymer comprises, as monomer units, (meth)acrylic acid and at least two different $(C_1-C_6)$-alkyl (meth)acrylate monomers. In the copolymer, the (meth)acrylic acid is present preferably in amounts of from 40% by weight to 60% by weight, with particular preference from 46% by weight to 55% by weight, based on the amount of the overall copolymer. The $(C_1-C_6)$-alkyl (meth)acrylate monomer I is present preferably in amounts of from 30% to 50% by weight, in particular from 36% by weight to 46% by weight, and the (meth)acrylate polymer II preferably in amounts of from 1% by weight to 10% by weight, in particular from 2% by weight to 8% by weight, based in each case on the amount of the overall copolymer. The rheological auxiliary is intended to give the basecoat composition the desired viscosity especially at the generally alkaline pH that is employed. A particularly preferred thickener is, if in dispersion form, mobile and thickened at a neutral or basic pH. The acrylate copolymer is added suitably as a finished dispersion. As emulsifiers, such dispersions preferably comprise fatty alcohol alkoxylates, especially $C_8-C_{22}$ fatty alcohol ethoxylates. A particularly suitable acrylate copolymer dispersion is obtainable commercially under the designation Viscalex HV 30 (Allied Corporation, Great Britain).

The thickener is present in the basecoat composition used in accordance with the invention preferably in an amount of from 0.5 to 5.0% by weight, in particular from about 0.3 to 1.5% by weight, based on the solids content. Usually, the thickener is employed as a dispersion with a concentration of from 5 to 45% by weight, preferably from 7 to 35% by weight.

The basecoat composition may also include further thickeners and/or Theological auxiliaries, such as ionic phyllosilicates, xanthan gum, diurea compounds, polyurethane thickeners, bentonite, waxes, and wax copolymers.

As auxiliary binders the novel coating composition may also include epoxy-functional and/or carboxyl-functional constituents, such as customary glycidyl compounds, for example glycidyl acrylate or glycidyl methacrylate. Examples of suitable carboxyl-functional crosslinking agents are carboxylic acids, especially saturated, straight-chain, aliphatic dicarboxylic acids with 3 to 20 carbon atoms in the molecule, preference being given to the use of dodecane-1,12-dioic acid.

Polyvinyl alcohol may also be used as a further auxiliary binder. It has been found that the addition of polyvinyl alcohol in an amount of up to 10% by weight, preferably from 1 to 5% by weight, makes it possible to improve the compatibility with the topcoat compositions which are applied over the basecoat composition. Polyvinyl alcohol has a solvent-repelling effect, so that solvent or other components possibly present in the topcoat composition are unable, owing to the repellent effect of the polyvinyl alcohol, to penetrate the basecoat composition and alter the color.

Further crosslinking agents which can be employed are those known in the paint sector, such as melamine resins, which are able to react with free OH groups.

In addition to the above-described polymers the basecoat compositions may also include further compatible, water-dilutable resins, for example amino resins, polyesters, polyurethanes and also acrylated polyurethanes and urethanized acrylates, which serve as additives for achieving certain coating properties such as improved adhesion or generally as grinding resins for pigments.

The auxiliary binder and/or the crosslinking agent can be employed in an amount of up to 10% by weight, in particular from 0.5 to 10% by weight.

The basecoat compositions employed in accordance with the invention generally have a solids content of from about 15 to 60% by weight. The solids content varies with the intended use of the coating compositions. For metallic finishes, for example, it is preferably from 12 to 25% by weight. For solid-color coating materials it is higher, for example from 14 to 45% by weight.

To neutralize components (i) and (ii) it is possible to employ ammonia and/or amines (especially alkylamines), amino alcohols and cyclic amines, such as di- and triethylamine, aminomethylpropanol, dimethylaminoethanolamine, diisopropanolamine, morpholine and N-alkylmorpholine. Highly volatile amines are preferred for the neutralization. The aqueous coating composition is normally adjusted to a pH of between 6 and 9, preferably from 7 to 8.5.

The basecoat composition may include organic solvents in an amount of up to 15% by weight. Examples of suitable organic solvents are naphthalenes, petroleum spirits and alcohols. As further liquid components the novel basecoats may include alkylene glycols, such as ethylene glycol, propylene glycol, butylene glycol, 1,4-butanediol, 1,6-hexanediol, neopentylglycol and other diols, such as dimethylolcyclohexane.

As pigments the basecoat composition can comprise customary pigments employed for coating car bodies, such as, for example, special-effect pigments and also organic and inorganic color-imparting pigments.

Examples of suitable special-effect pigments are commercial aluminum bronzes, the aluminum bronzes chromated in accordance with DE-A 36 36 183, commercial stainless-steel bronzes, and other customary metal platelets and metal flake pigments, and nonmetallic special-effect pigments, such as pearlescent and interference pigments, for example.

Examples of suitable inorganic color-imparting pigments are titanium dioxide, iron oxides, carbon black, and the like. Examples of organic color-imparting pigments are Indanthrene Blue, Chromophthal Red, Irgazine Orange, Sicotrans Yellow, Heliogen Green and the like. it is also possible for anticorrosion pigments, such as zinc phosphate, to be present.

In addition, the basecoat composition may also include fillers which are customary in the field of paint chemistry. These include silicic acid, magnesium silicate, talc, titanium dioxide and barium sulfate.

The proportion of pigments and fillers in the novel coating composition may total from 3 to 25% by weight, based on the solids content. The pigment can be added in any desired form, for example as an aqueous slurry or as a paste. The pigments can be dispersed, for example, with a grinding resin, such as an auxiliary binder, dispersing aid or water. In the case of solidcolor coating materials it is preferred to slurry the pigments in dispersing aid and water. Where aluminum and/or flakes are employed, they are slurried, if desired, in solvent and, if appropriate, in a mixture of water and wetting agent, or dispersed in the principal binder or in another, auxiliary binder.

The amount of component (i) may vary depending on the pigment employed. If the pigments are organic and/or inorganic color-imparting pigments, then component (i) is preferably present in an amount of from 25 to 50% by weight, based on the solids content. If the pigments are special-effect pigments, component (i) is preferably present in an amount of from 15 to 30% by weight, based on the solids content.

As further component the basecoat composition may include film-forming auxiliaries. Suitable film-forming auxiliaries are dialkyl dicarboxylates, 1,2-propylene glycol, high-boiling petroleum spirits and naphthalenes, which have a boiling point of more than 100° C., preferably more than 140° C.

The basecoat composition may if desired include further auxiliaries and additives. Examples of these are catalysts, auxiliaries, antifoams, dispersing aids, wetting agents, preferably carboxy-functional dispersants, antioxidants, UV absorbers, free-radical scavengers, leveling agents, biocides and/or water retention agents.

The basecoat composition is applied to a substrate surface coated with a customary primer surfacer. As primer surfacer it is possible to employ any desired primer surfacer known from the prior art.

Following the application of the primer surfacer, the above-described basecoat composition is applied in a manner known per se, for example by spraying, brushing, dipping, flowcoating, knifecoating or rolling, to the substrate, for example metal, plastic, wood or glass.

Before application to the primer surfacer coat, the basecoat composition may if desired be admixed with water to adjust the solids content, with solvent or Theological auxiliary to establish the applications properties, and also, if desired, with a base for pH regulation. If the viscosity is still not within the desired range, then it is possible to add again rheological auxiliary (ii) or further thickeners, if appropriate in an amount of from 0.001 to 0.006% by weight, based on the solids content.

The basecoat applied to the substrate in step (A) is, in accordance with the invention, over-coated in step (B) with a suitable transparent topcoat. Before applying the transparent topcoat, the coating composition is advantageously left to evaporate for a short time, preferably from 1 to 15 minutes, in particular from 4 to 8 minutes, at a temperature of from 60 to 100° C., preferably from 70 to 85° C. The evaporation period depends on the temperature and can be adjusted over wide ranges.

Particularly resistant multilayer coatings can be obtained if the substrate obtained in step (A) is partially dried before the topcoat is applied, so that a sufficient degree of film formation and/or crosslinking is present to ensure that water and/or solvents which may possibly be present in the topcoat composition applied in step (B) are unable to diffuse into the basecoat.

All customary topcoats can be applied as the transparent topcoat. Preference is given to the use of transparent coating materials used in the field of paint chemistry, such as waterborne or solventborne clearcoats, transparent powder coatings, transparent powder slurry coatings, solvent-containing and aqueous two-component clearcoats, etc.

The transparent topcoat can be applied by customary methods which are known in the prior art.

The present invention also provides, accordingly, a multilayer-coated substrate, where the coating is applied to the substrate surface, such that (A) an aqueous coating composition comprising as film-forming agent an aqueous polymer dispersion is applied as basecoat composition to a substrate surface coated with a customary primer surfacer, (B) a suitable transparent topcoat composition is applied to the basecoat thus obtained, and (C) the basecoat is baked together with the topcoat,
wherein the basecoat composition comprises an aqueous polymer dispersion comprising
(i) an acrylate polymer based on from 30 to 60% by weight of $C_1$–$C_8$-alkyl (meth)acrylate monomers, from 30 to 60% by weight of vinyl-aromatic monomers and from 0.5 to 10% by weight of (meth)acrylic acid, and
(ii) a thickener, which does not have an associative action, comprising an acrylate copolymer based on ($C_1$–$C_6$)-alkyl (meth)acrylate and (meth) acrylic acid.

In connection with the repair of multilayer coatings it is possible to apply the basecoat composition to the substrate surface which is to be repaired, without special means of assistance. The coating composition can be cured at ambient temperature. When curing at ambient temperature, the abovementioned baking time is extended accordingly, and is approximately between 15 and 24 hours. A particular means of assistance or a special device for curing this coating composition, therefore, is unnecessary.

EXAMPLES

Example 1

A. 22 parts by weight of water, 2 parts by weight of Solvesso® 200 ($C_{10}$–$C_{13}$ aromatics mixture) and 1 part by weight of butylglycol were charged to a reaction vessel. 30 parts by weight of Acronal 290 D (aqueous dispersion, solids content 50.0%) were added with stirring.

B. A mixture of 7.6 parts by weight of water and 2 parts by weight of Viscalex HV 30 (solids content 30.6%) was slowly added to the mixture obtained in A.

The pH of the mixture obtained was adjusted with dimethylethanolamine (DMEA) to 8.0.

C. In a separate mixer, a mixture of 5 parts by weight of aluminum flakes and 5 parts by weight of butylglycol was stirred until smooth.

With vigorous stirring, the aluminum slurry obtained in C. was added in portions to the mixture obtained in B.

The viscosity of the resulting coating material was adjusted with 25 parts by weight of water to 110 mPas. The solids content was 18.85%.

Example 2

A. 22 parts by weight of water, 2 parts by weight of Solvesso® 200 ($C_{10}$–$C_{13}$ aromatics mixture) and 1 part by weight of butylglycol were charged to a reaction vessel. 25 parts by weight parts by weight [sic] of Acronal 290 D (aqueous dispersion, solids content 50.0%) were added with stirring.

B. A mixture of 7.6 parts by weight of water and 2 parts by weight of Viscalex EV 30 (solids content 30.6%) was slowly added to the mixture obtained in A.

The pH of the mixture obtained was adjusted with 0.4 part by weight of dimethylethanolamine (DMEA) to 8.0.

C. In a separate mixer, a mixture of 5 parts by weight of aluminum flakes and 5 parts by weight of butylglycol was stirred until smooth.

D. In a further separate mixer, 5 parts by weight of glycidyl methacrylate/dodecanedioic acid were dispersed in 25 parts by weight of water and ground to a particle size of less than 5 μm.

The mixture obtained in B was incorporated with vigorous stirring into the dispersion obtained in D.

Subsequently, the aluminum slurry obtained in C was added in portions to the mixture obtained.

The viscosity of the resulting coating material was adjusted with 25 parts by weight of water to 110 mPas. The solids content was 18.35%.

Example 3

A coating formulation was prepared in accordance with the procedure described in Example 2, with the exception that in step D 10 parts by weight of glycidyl methacrylate/dodecanedioic acid were dispersed in 20 parts by weight of water.

The solids content was 20.35%.

Example 4

A. 22 parts by weight of water, 2 parts by weight of Solvesso® 200 ($C_{10}$–$C_{13}$ aromatics mixture) and 1 part by weight of butylglycol were charged to a reaction vessel. 30 parts by weight parts by weight [sic] of Acronal 290 D (aqueous dispersion, solids content 50.0%) were added with stirring.

B. A mixture of 7.6 parts by weight of water and 2 parts by weight of Viscalex HV 30 (solids content 30.6%) was slowly added to the mixture obtained in A.

The pH of the mixture obtained was adjusted with 0.4 part by weight of dimethylethanolamine (DMEA) to 8.0.

C. In a separate mixer, a mixture of 5 parts by weight of aluminum flakes and 5 parts by weight of butylglycol was stirred until smooth.

D. In a further separate mixer, 10 parts by weight of a polyester obtained from 9.8% by weight of neopentylglycol, 6.2% by weight of hexahydrophthalic acid, 22.9% by weight of Pripol® (commercial product from Unichema), 11.1% by weight of hexanediol and 2.0% by weight of xylene as solvent, and 2.2 parts by weight of the melamine Cymel® 303 (Cyanamid) were dispersed in 12.8 parts by weight of water.

The mixture obtained in B was incorporated with vigorous stirring into the dispersion obtained in D.

Subsequently, the aluminum slurry obtained in C was added in portions to the mixture obtained.

The solids content of the coating material was 26.83%.

Example 5

A. 22 parts by weight of water, 2 parts by weight of Lusolvan FBH® (commercial product from BASF AG, Ludwigshafen) and 1 part by weight of butylglycol were charged to a reaction vessel. 30 parts by weight parts by weight [sic] of Acronal 290 D (aqueous dispersion, solids content 50.0%) were added with stirring.

B. A mixture of 7.6 parts by weight of water and 2 parts by weight of Viscalex HV 30 (solids content 30.6%) was slowly added to the mixture obtained in A.

The pH of the mixture obtained was adjusted with dimethylethanolamine (DMEA) to 8.0.

C. 30 parts by weight of an Irgazinrot® DPP BO paste (pigment content 43.2% by weight) were added to the mixture obtained in step B and stirred until smooth.

The viscosity of the resulting coating material was adjusted with 5 parts by weight of water to 110 mPas.

Example 6

A. 22 parts by weight of water, 2 parts by weight of Lusolvan FBH® (commercial product from BASF AG, Ludwigshafen) and 1 part by weight of butylglycol were charged to a reaction vessel. 25 parts by weight parts by weight [sic] of Acronal 290 D (aqueous dispersion, solids content 50.0%) were added with stirring.

B. A mixture of 7.6 parts by weight of water and 2 parts by weight of Viscalex HV 30 (solids content 30.6%) was slowly added to the mixture obtained in A.

The pH of the mixture obtained was adjusted with dimethylethanolamine (DMEA) to 8.0.

C. In a separate mixer, 28.79 parts by weight of an Irgazinrot® DPP BO paste (pigment content 43.2% by weight), 1.17 parts by weight of Disperbyk® 190 (dispersing aid) and 0.03 part by weight of the copolymer employed in step B were dispersed and were ground to a particle size below 5 μm.

D. In a further separate mixer, 5 parts by weight of glycidyl methacrylate/dodecanedioic acid were dispersed in 25 parts by weight of water and were ground to a particle size of less than 5 μm.

The mixture obtained in B was incorporated with vigorous stirring into the dispersion obtained in D.

Subsequently, the pigment paste obtained in C was added in portions to the mixture obtained.

The solids content was 28.06%.

Example 7

The procedure described in Example 6 was repeated except that in step A 20 parts by weight of the acrylate dispersion and in step D 10 parts by weight of glycidyl methacrylate/dodecanedioic acid were employed.

Example 8

A. 22 parts by weight of water, 2 parts by weight of Lusolvan FBH® (commercial product from BASF AG, Ludwigshafen) and 1 part by weight of butylglycol were charged to a reaction vessel. 15 parts by weight of Acronal 290 D (aqueous dispersion, solids content 50.0%) acrylate dispersion [sic] were added with stirring.

B. A mixture of 7.6 parts by weight of water and 2 parts by weight of Viscalex HV 30 (solids content 30.6%) was slowly added to the mixture obtained in A.

The pH of the mixture obtained was adjusted with dimethylethanolamine (DMEA) to 8.0.

C. In a separate mixer, 28.79 parts by weight of an Irgazinrot® DPP BO paste (pigment content 43.2% by weight), 1.17 parts by weight of Disperbyk® 190 and 0.03 part by weight of the copolymer employed in step B were dispersed and were ground to a particle size below 5 μm.

D. In a further separate mixer, 10 parts by weight of a polyester obtained from 9.8% by weight of neopentylglycol, 6.2% by weight of hexahydrophthalic acid, 22.9% by weight of Pripol® (commercial product from Unichema), 11.1% by weight of hexanediol and 2.0% by weight of xylene as solvent, and 2.2 parts by weight of the melamine Cymel® 303 (Cyanamid) were dispersed in 12.8 parts by weight of water.

The mixture obtained in B was incorporated with vigorous stirring into the dispersion obtained in D. Subsequently, the pigment preparation prepared in step B was incorporated by stirring.

The solids content was 29.04%.

What is claimed is:

1. A process for preparing a multilayer coating on a substrate surface, comprising
   (A) applying to a substrate surface coated with a primer surfacer an aqueous basecoat composition comprising as film-forming agent an aqueous polymer dispersion to form a basecoated substrate,
   (B) applying a transparent topcoat composition to the basecoated substrate of step A, and
   (C) baking the aqueous basecoat composition together with the topcoat,
   wherein the aqueous basecoat composition comprises an aqueous polymer dispersion comprising
      (i) an acrylate polymer based on from 30 to 60% by weight of $C_1$–$C_8$-alkyl (meth)acrylate monomers, from 30 to 60% by weight of vinyl-aromatic monomers and from 0.5 to 10% by weight of (meth)acrylic acid, and
      (ii) a thickener, which does not have an associative action, comprising an acrylate copolymer based on ($C_1$–$C_6$-alkyl (meth)acrylate and (meth)acrylic acid.

2. A process for repairing multilayer coatings, comprising:
   (D) repairing a basecoat applied to a primer surfacer with an aqueous basecoat composition comprising an aqueous polymer dispersion as a film-forming agent, to form a repaired coating,
   (E) coating the repaired coating obtained in step (D) with a transparent topcoat composition, and
   (F) baking the aqueous basecoat composition together with the topcoat,
   wherein the aqueous basecoat composition comprises an aqueous polymer dispersion comprising
      (i) an acrylate polymer based on form 30 to 60% by weight of $C_1$–$C_8$-alkyl (meth)acrylate monomers, from 30 to 60% by weight of vinyl-aromatic monomers and from 0.5 to 10% by weight of (meth)acrylic acid, and
      (ii) a thickener, which does not have an associative action, comprising an acrylate copolymer based on ($C_1$–$C_6$)-alkyl (meth)acrylate and (meth) acrylic acid.

3. The process of claim 1, wherein the $C_1$–$C_8$-alkyl (meth)acrylate monomers of component (i) are selected from the group consisting of methyl (meth)acrylate, ethyl (meth)acrylate, and mixtures thereof.

4. The process of claim 1, wherein the vinyl-aromatic monomers of component (i) are selected from the group consisting of styrene, α-alkylstyrene vinyltoluene, and mixtures thereof.

5. The process of claim 1, wherein component (i) is employed in the form of a dispersion with a solids content of from 30 to 60% by weight.

6. The process of claim 1, wherein the acrylate copolymer of component (ii) comprises, as monomer units, (meth)acrylic acid and at least two different acrylate monomers, the (meth)acrylic acid being present in amounts of from 40% by weight to 60% by weight, based on the amount of the overall copolymer and the ($C_1$–$C_6$)-alkyl (meth)acrylate monomer I being present in amounts of from 30% by weight to 50% by weight, and the (meth)acrylate polymer II in amounts of from 1% by weight to 10% by weight, based in each case on the amount of the overall copolymer.

7. The process of claim 1, wherein the aqueous basecoat composition further comprises compounds selected from the group selected from the group consisting of epoxy-functional compounds, carboxyl-functional compounds, and mixtures thereof.

8. The process of claim 1, wherein the aqueous basecoat composition further comprises from 5 to 25% by weight of compounds selected from the group consisting of special-effect pigments, organic color-imparting pigments, inorganic color-imparting pigments, and mixtures thereof.

9. The process of claim 8, wherein the aqueous basecoat composition comprises from 25 to 50% by weight of component (i) and a compound selected from the group consisting of organic color-imparting pigments, inorganic color-imparting pigments, and mixtures thereof, based on the solids content.

10. The process of claim 9, wherein the aqueous basecoat composition further comprises special-effect pigments and component (i) in an amount of from 15 to 30% by weight, based on the solids content.

11. The process of claim 1, wherein the transparent topcoat composition of step (B) is selected from the group consisting of waterborne clearcoats solventborne clearcoats, transparent powder coatings, transparent powder slurry coatings, solvent-containing two-component clearcoats and aqueous two-component clearcoats.

12. A multilayer-coated substrate, where the coating is applied to the substrate surface, such that
   (A) an aqueous coating composition comprising as film-forming agent an aqueous polymer dispersion is applied as basecoat composition to a substrate surface coated with a primer surfacer,
   (B) a transparent topcoat composition is applied to the basecoat thus obtained, and
   (C) the basecoat is baked together with the topcoat,
   wherein the basecoat composition comprises an aqueous polymer dispersion comprising
      (i) an acrylate polymer based on from 30 to 60% by weight of $C_1$–$C_8$-alkyl (meth)acrylate monomers, from 30 to 60% by weight of vinyl-aromatic monomers and from 0.5 to 10% by weight of (meth)acrylic acid, and
      (ii) a thickener, which does not have an associative action, comprising an acrylate copolymer based on ($C_1$–$C_6$-alkyl (meth)acrylate and (meth)acrylic acid.

13. The process of claim 5, wherein component (i) is employed in the form of a dispersion with a solids content of from 35 to 60% by weight.

14. The process of claim 1, wherein the aqueous polymer dispersion is anionically stabilized.

15. The process of claim 1, wherein the aqueous basecoat composition has an alkaline pH.

16. The process of claim 1, wherein the aqueous basecoat composition has a pH of from 6 to 9.

17. The process of claim 1, wherein the aqueous basecoat composition has a pH of from 7 to 8.5.

* * * * *